(12) United States Patent
Sudorowski et al.

(10) Patent No.: US 7,951,037 B2
(45) Date of Patent: May 31, 2011

(54) FOUR PINION DIFFERENTIAL WITH CROSS PIN RETENTION UNIT AND RELATED METHOD

(75) Inventors: Christopher M. Sudorowski, Westland, MI (US); Heather A. Moore, Ortonville, MI (US); Joseph S. Balenda, II, Grand Blanc, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 65 days.

(21) Appl. No.: 12/542,966

(22) Filed: Aug. 18, 2009

(65) Prior Publication Data
US 2009/0305835 A1 Dec. 10, 2009

Related U.S. Application Data

(63) Continuation of application No. 11/736,759, filed on Apr. 18, 2007, now Pat. No. 7,591,751.

(51) Int. Cl.
*F16H 48/08* (2006.01)
(52) U.S. Cl. ...................................... 475/230
(58) Field of Classification Search .............. 475/230, 475/231
See application file for complete search history.

(56) References Cited

U.S. PATENT DOCUMENTS

| | | | |
|---|---|---|---|
| 696,704 A | 4/1902 | Allen | |
| 1,115,536 A | 11/1914 | Hinkley | |
| 1,322,689 A | 11/1919 | Griffing | |
| 1,461,102 A | 7/1923 | Sternbergh | |
| 2,545,601 A * | 3/1951 | Brubaker | 475/231 |
| 2,808,740 A | 10/1957 | Boden | |
| 2,971,404 A | 2/1961 | Thornton | |
| 3,593,595 A | 7/1971 | Taylor | |
| 3,651,713 A | 3/1972 | Mueller | |
| 3,872,741 A * | 3/1975 | Berchtold et al. | 475/246 |
| 3,894,447 A | 7/1975 | Michael | |
| 3,974,717 A | 8/1976 | Breed et al. | |
| 4,363,248 A | 12/1982 | Brisabois | |
| 4,467,672 A | 8/1984 | Lamy | |
| 4,722,244 A | 2/1988 | Tsuchiya et al. | |
| 4,901,599 A | 2/1990 | Irwin | |
| 5,059,160 A | 10/1991 | Raniero | |
| 5,186,694 A | 2/1993 | Cooper | |
| 5,545,102 A | 8/1996 | Burgman et al. | |
| 5,647,814 A | 7/1997 | Krisher | |
| 6,254,505 B1 | 7/2001 | Forrest | |
| 6,394,927 B1 * | 5/2002 | Bongard | 475/231 |
| 6,699,154 B2 | 3/2004 | Orr et al. | |
| 7,025,702 B2 | 4/2006 | Saito et al. | |
| 7,081,065 B2 | 7/2006 | Sudou | |
| 7,155,997 B2 | 1/2007 | Santelli | |
| 2004/0166985 A1 * | 8/2004 | Sudou | 475/230 |
| 2005/0070394 A1 | 3/2005 | Sugeta et al. | |
| 2005/0282677 A1 * | 12/2005 | Saito et al. | 475/230 |
| 2008/0242469 A1 | 10/2008 | Jenski et al. | |
| 2009/0017962 A1 | 1/2009 | Isken, II et al. | |
| 2009/0075777 A1 | 3/2009 | Han et al. | |
| 2009/0088285 A1 | 4/2009 | Downs et al. | |

* cited by examiner

*Primary Examiner* — Sherry Estremsky
(74) *Attorney, Agent, or Firm* — Harness, Dickey & Pierce, P.L.C.

(57) ABSTRACT

A differential having four pinions supported for rotation on cross pins within a differential case. The differential employs a retainer system for securing the cross pins relative to the differential case. The retainer system can include a retainer, such as a clip or a pair of roll pins, that can secure at least one of the cross pins in place.

32 Claims, 8 Drawing Sheets

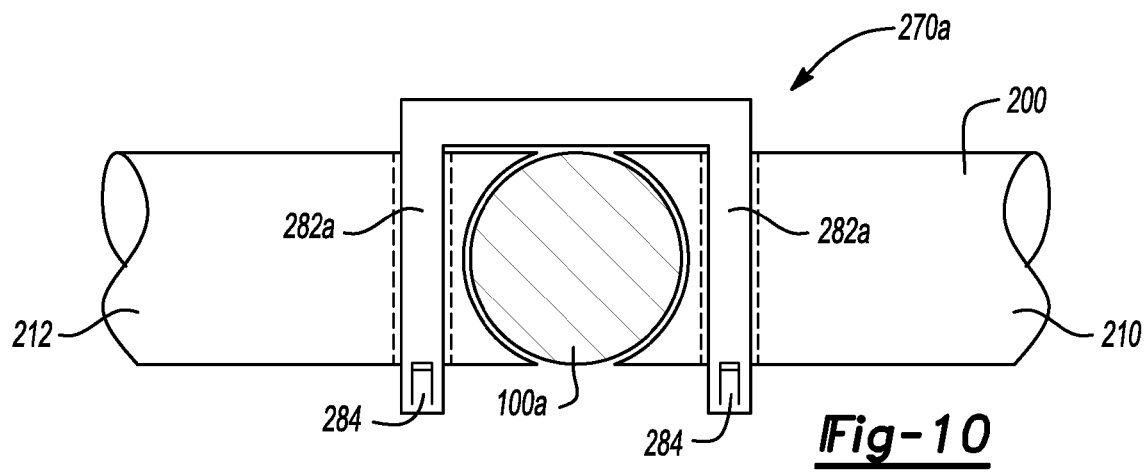
_Fig-10_
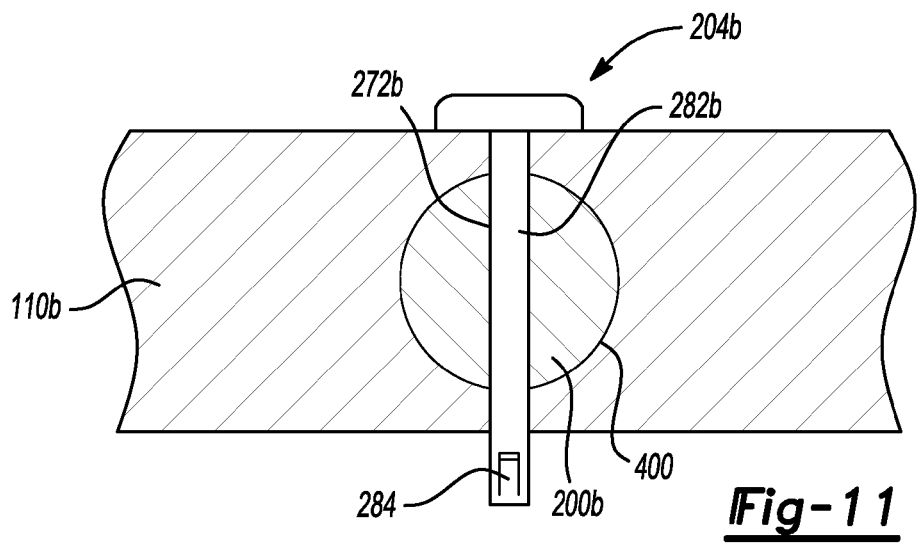
_Fig-11_
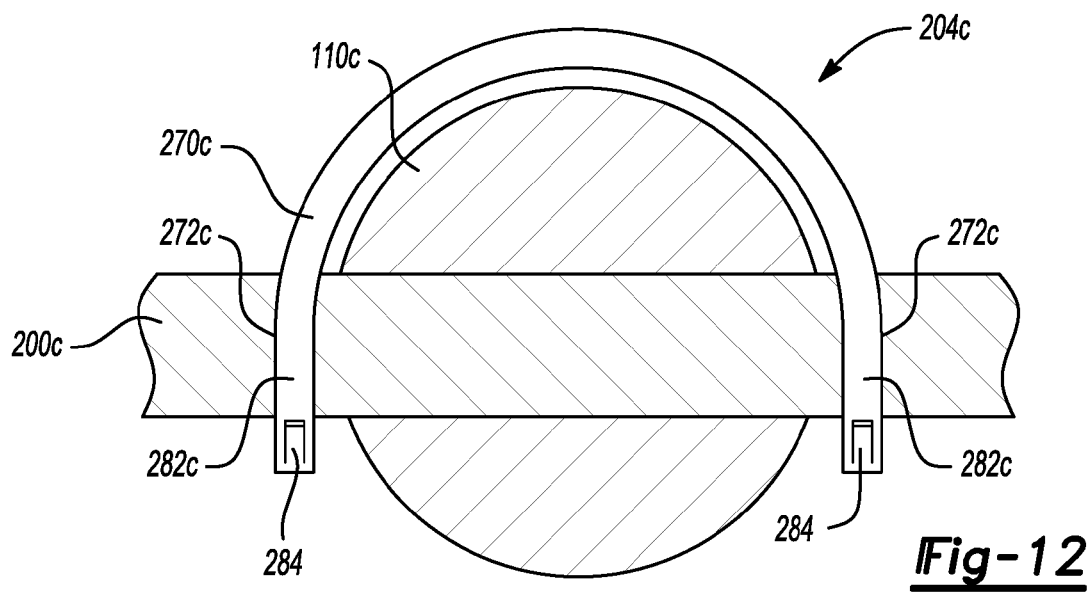
_Fig-12_

FOUR PINION DIFFERENTIAL WITH CROSS PIN RETENTION UNIT AND RELATED METHOD

CROSS REFERENCE TO RELATED APPLICATIONS

This application is a continuation of U.S. patent application Ser. No. 11/736,759 filed on Apr. 18, 2007, now U.S. Pat. No. 7,591,751. The entire disclosure of the above application is incorporated herein by reference.

FIELD OF THE INVENTION

The present disclosure generally relates to vehicle drivelines and more particularly to a differential for a vehicle driveline.

One type of automotive differential employs a differential housing, a pair of bevel side gears and a plurality of bevel pinions. Some application employ a single pair of bevel pinions that are meshingly engaged with the bevel side gears and supported for rotation in the differential housing about an axis via a single pinion shaft. Vehicle differentials configured for heavier duty applications typically employ two pair of bevel pinions that are meshingly engaged with the bevel side gears. A first pair of the bevel pinions are supported for rotation about a first pinion axis by a first pinion shaft, while a second pair of the bevel pinions are supported about a second pinion axis by a second pinion shaft. In some heavy duty differentials, the first and second pinion shafts are part of a unitarily formed cross-shaped structure. Some other heavy duty differentials employ a configuration in which an aperture or notch is formed in one or both of the first and second pinion shafts. The aperture or notch in one of the first and second pinion shafts provides clearance for the other one of the first and second pinion shaft. Still other heavy duty differentials employ a configuration in which the second pinion shaft is formed by two shaft members that terminate proximate the first pinion shaft. Examples of this configuration include U.S. Pat. No. 7,155,997.

While such configurations are relatively robust, the coupling of the first and second pinion shafts to the differential housing can be complex and/or costly. Accordingly, there remains a need in the art for an improved heavy duty differential having multiple pinion shafts that can be robustly secured relative to the differential housing in a relatively simple, efficient and cost-effective manner.

SUMMARY OF THE INVENTION

In one form, the present teachings provide a differential for an automotive driveline. The differential includes a differential housing, first and second bevel side gears, a first pinion shaft, a first set of bevel pinions, a second set of bevel pinions and a retainer assembly. The differential housing defines an internal cavity, an axle bore and first and second pinion bores. The axle bore is disposed through the differential housing and intersects the internal cavity. The axle bore is disposed about a rotational axis of the differential housing. The first and second pinion bores are perpendicular to one another and perpendicular to the rotational axis. The first and second bevel side gears are received in the internal cavity and disposed about the rotational axis. The first pinion shaft is received in the first pinion bore and coupled to the differential housing. The first set of bevel pinions are rotatably disposed on the first pinion shaft and meshingly engaged with the first and second bevel side gears. The second set of bevel pinions is meshingly engaged with the first and second bevel side gears. The retainer assembly is received in the second pinion bore and supports the second set of bevel pinions for rotation thereon. The retainer assembly includes first and second pin portions and a clip. The first pin portion is received in a first side of the second pinion bore and through a first one of the second set of bevel pinions. The second pin portion is received in a second side of the second pin bore and through a second one of the second set of bevel pinions. The clip has a plurality of leg members, each of which being received through a hole formed in at least two of the first pin portion, the second pin portion and the first pinion shaft. At least one of the leg members carries a deflectable barb that deflects to an engaging position after the clip has been installed. The engaging position resists withdrawal of the leg members from the holes.

In another form, the present teachings provide a method for assembling an automotive differential. The method includes: providing a differential case having an internal cavity; installing a first bevel side gear into the internal cavity for rotation about a rotational axis; meshingly engaging a first set of bevel pinions to the first bevel side gear for rotation about a first pinion axis; meshingly engaging a second set of bevel pinions to the first bevel side gear for rotation about a second pinion axis; positioning a collar in the internal cavity radially inwardly of the first and second sets of bevel pinions; installing first and second pin portions to the first set of bevel pinions, each of the first and second pin portions extending through the collar, through an associated one of the first set of bevel pinions and engaging the differential case; installing a first pinion shaft to the second set of bevel pinions, the first pinion shaft extending through the collar and the second set of bevel pinions, the first pinion shaft having opposite ends that engage the differential case; and installing a retainer to at least two of the first pin portion, the second pin portion and the first pinion shaft, the retainer being received radially inwardly of the collar, the retainer limiting axial movement of the first and second pin portions along a pinion axis about which the first set of bevel pinions rotate.

In still another form, the teachings of present disclosure provide a differential for an automotive driveline. The differential can include a differential housing, first and second bevel side gears, a first pinion shaft, a first set of bevel pinions, a second set of bevel pinions, and a retainer assembly. The differential housing defines an internal cavity, an axle bore and first and second pinion bores. The axle bore is disposed through the differential housing and intersects the internal cavity. The axle bore is disposed about a rotational axis of the differential housing. The first and second pinion bores are perpendicular to one another and perpendicular to the rotational axis. The first and second bevel side gears are received in the internal cavity and disposed about the rotational axis. The first pinion shaft is received in the first pinion bore and coupled to the differential housing. The first set of bevel pinions are rotatably disposed on the first pinion shaft and meshingly engaged with the first and second bevel side gears. The second set of bevel pinions are meshingly engaged with the first and second bevel side gears. The retainer assembly is received in the second pinion bore and supports the second set of bevel pinions for rotation thereon. The retainer assembly includes a collar, first and second pin portions and at least one retainer. The collar is an annular structure that is disposed about the rotational axis radially inwardly of the first and second sets of bevel pinions. The collar has a first set of collar apertures and a second set of collar apertures. The first pinion shaft is received through the first set of collar apertures. The first pin portion is received in a first side of the second pinion bore, a first one of the second set of bevel pinions and the second set of collar apertures. The second pin portion is received in a second side of the second pin bore, a second one of the second set of bevel pinions and the second set of collar apertures. The retainer engages at least one of the first and second pin portions at a location radially inward of the collar to limit movement of the first and second pin portions along a pinion axis about which the set of second bevel pinions rotate. The retainer is pushed through holes that are formed in at least two of the first pin portion, the second pin portion and the first pinion shaft. The holes are not formed in the collar.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 10 is a sectional view of a portion of another differential unit constructed in accordance with the teachings of the present disclosure;

FIG. 11 is a sectional view of a portion of yet another differential unit constructed in accordance with the teachings of the present disclosure; and FIG. 12 is a sectional view of a portion of still another differential unit constructed in accordance with the teachings of the present disclosure.

DETAILED DESCRIPTION OF THE PREFERRED EMBODIMENTS

Figure 1:
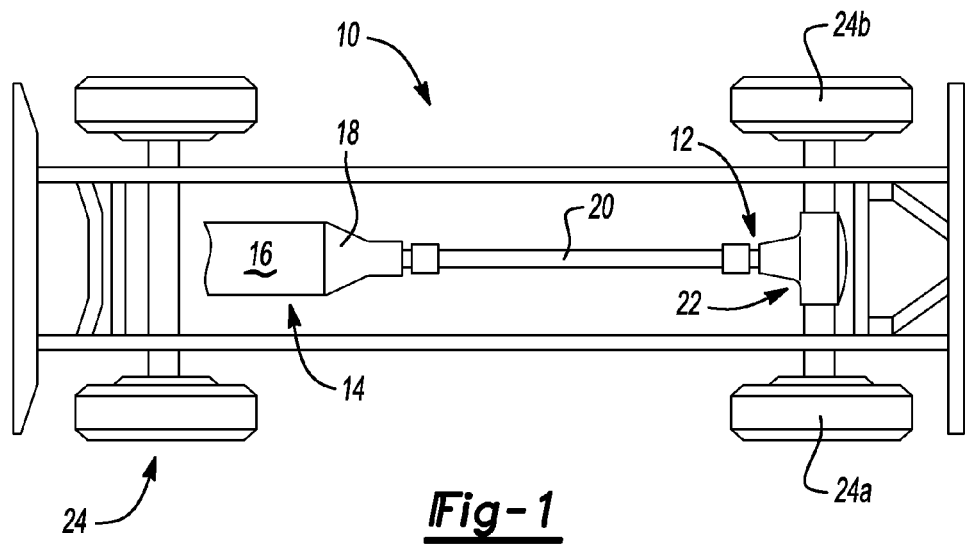
FIG. 1 is a schematic illustration of an exemplary vehicle having a differential unit constructed in accordance with the teachings of the present disclosure.

With reference to FIG. 1 of the drawings, a vehicle having a differential assembly that is constructed in accordance with the teachings of the present disclosure is generally indicated by reference numeral 10. The vehicle 10 can include a driveline 12 that is drivable via a connection to a power train 14. The power train 14 can include an engine 16 and a transmission 18. The driveline 12 can include a drive shaft 20, a rear axle 22 and a plurality of wheels 24. The engine 16 can be mounted in an in-line or longitudinal orientation along the axis of the vehicle 10 and its output can be selectively coupled via a conventional clutch to the input of the transmission 18 to transmit rotary power (i.e., drive torque) therebetween. The input of the transmission 18 can be commonly aligned with the output of the engine 16 for rotation about a rotary axis. The transmission 18 can also include an output and a gear reduction unit. The gear reduction unit can be operable for coupling the transmission input to the transmission output at a predetermined gear speed ratio. The drive shaft 20 can be coupled for rotation with the output of the transmission 18. Drive torque can be transmitted through the drive shaft 20 to the rear axle 22 where it can be selectively apportion in a predetermined manner to the left and right rear wheels 24a and 24b, respectively.

Figure 2:
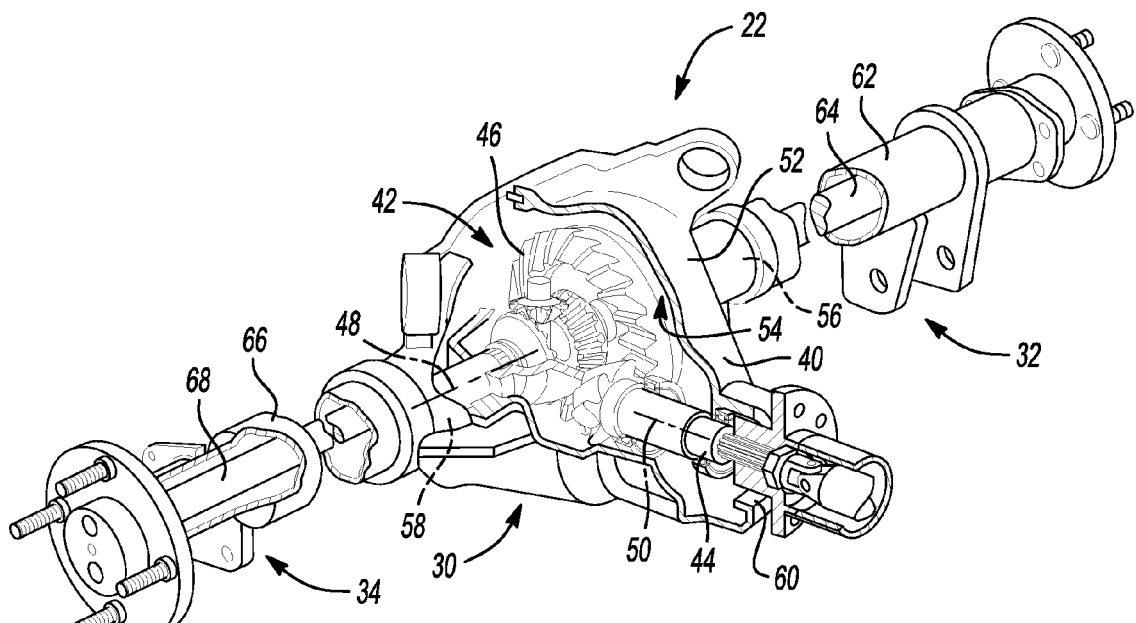
FIG. 2 is a partially broken away perspective view of a portion of the vehicle of FIG. 1 illustrating the rear axle assembly in more detail.

With additional reference to FIG. 2, the rear axle 22 can include a differential assembly 30, a left axle shaft assembly 32 and a right axle shaft assembly 34. The differential assembly 30 can include a housing 40, a differential unit 42, an input pinion 44 and a ring gear 46. The housing 40 can support the differential unit 42 for rotation about a first axis 48 and can further support the input pinion 44 for rotation about a second axis 50 that can be perpendicular to the first axis 48.

The housing 40 can be initially formed in a suitable casting process and thereafter machined as required. The housing 40 can include a wall member 52 that can define a central cavity 54 having a left axle aperture 56, a right axle aperture 58, and an input shaft aperture 60.

The left axle shaft assembly 32 can include a first axle tube 62 fixed to the left axle aperture 56 and a first axle half-shaft 64 that can be supported for rotation in the first axle tube 62 about the first axis 48. Similarly, the right axle shaft assembly 34 can include a second axle tube 66 that can be fixed to the right axle aperture 58 and which can support a second axle half-shaft 68 for rotation about the first axis 48.

The input pinion 44 can be disposed in the input shaft aperture 60 and can meshingly engage the ring gear 46, which can be fixedly but removably coupled to the differential unit 42. It will be appreciated that rotary power transmitted to the input pinion 44 from the drive shaft 20 is employed to drive the differential unit 42 about the first axis 48 via the ring gear 46 in a conventional manner. The differential unit 42 can transmit drive torque to the first and second axle half-shafts 64 and 68 in a predetermined manner.

Figure 3:
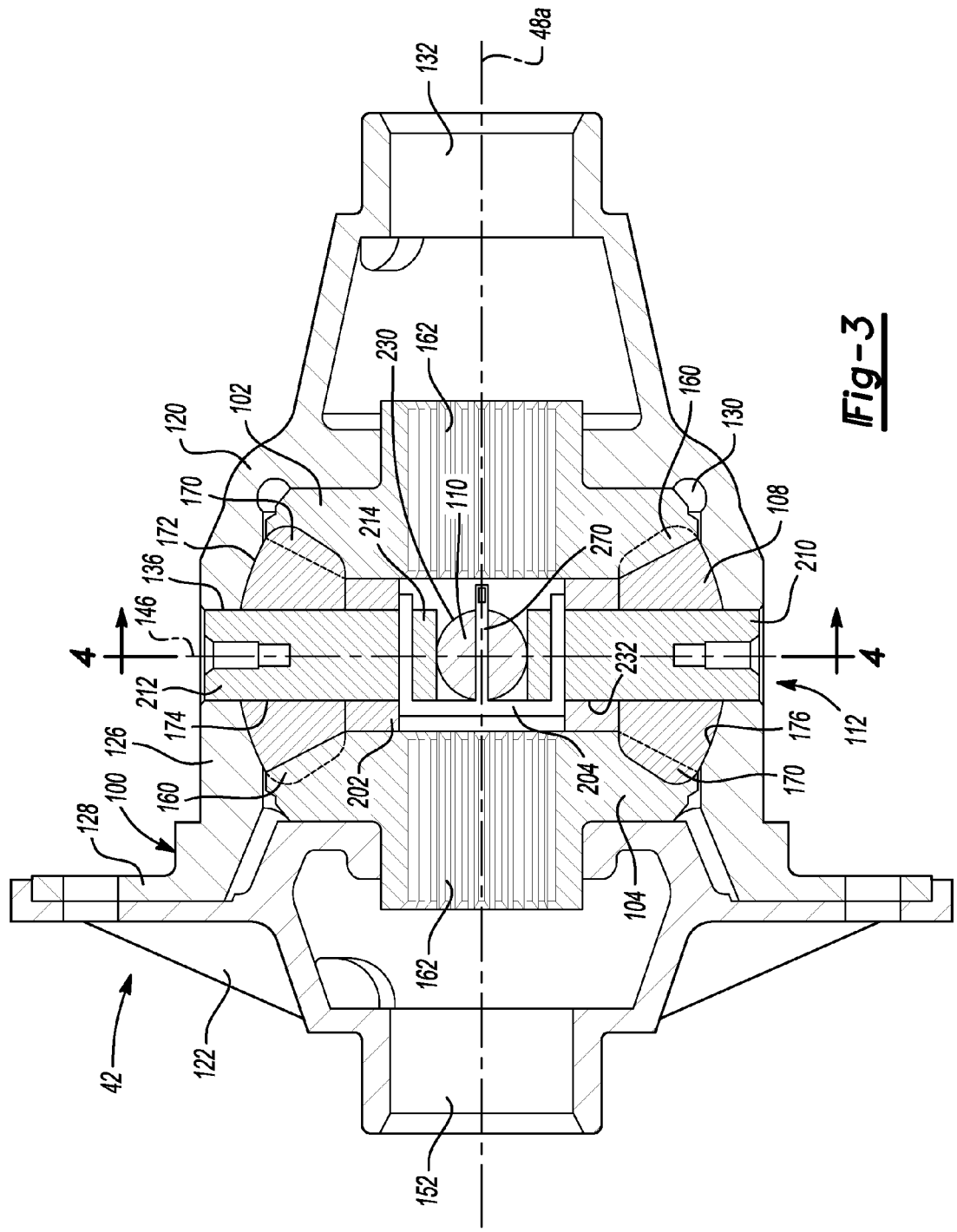
FIG. 3 is a sectional view of a portion of the vehicle of FIG. 1, illustrating the differential unit in longitudinal cross section.
Figure 4:
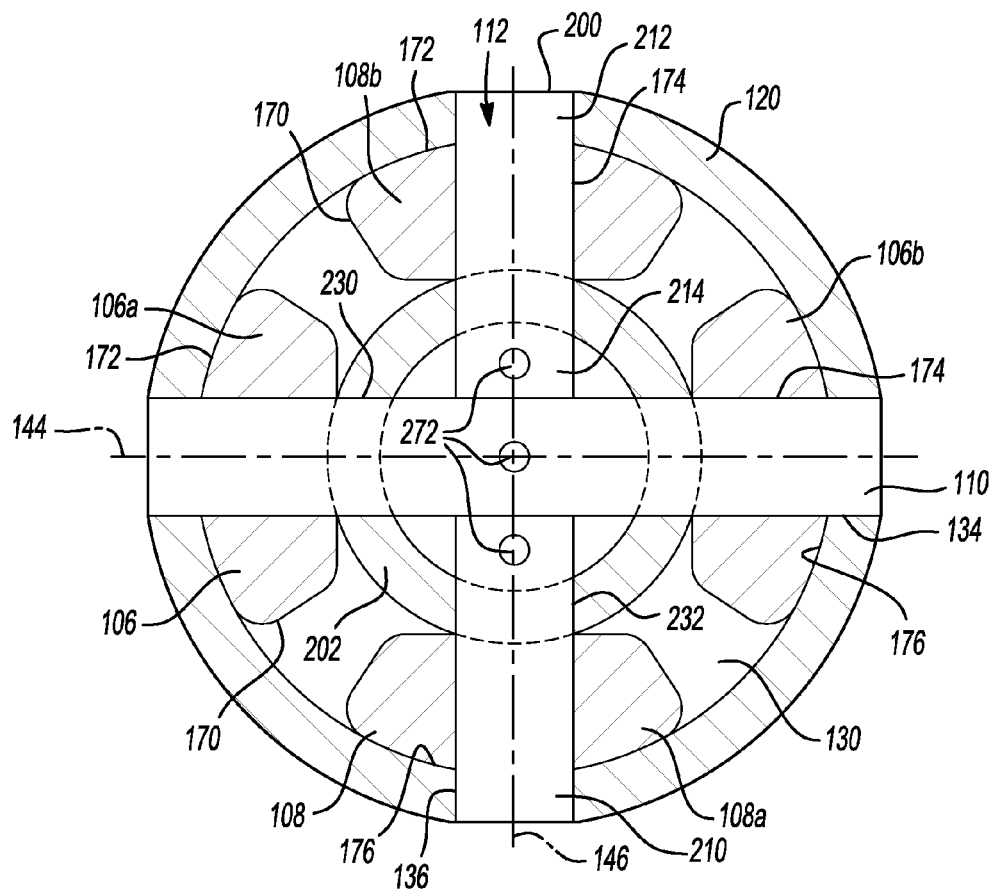
FIG. 4 is a sectional view taken along the line 4-4.

With additional reference to FIGS. 3 and 4, the differential unit 42 can be disposed within the central cavity 54 of the housing 40 and can include a differential housing 100, first and second bevel side gears 102 and 104, respectively, a first set of bevel pinions 106, a second set of bevel pinions 108, a first pinion shaft 110 and a retainer system 112.

The differential housing 100 can include a differential case 120 and a differential cover 122. The differential case 120 can have a body 126 and a flange 128 that can be disposed generally perpendicular to the rotational axis 48a of the differential unit 42. The body 126 can define an internal cavity 130, a first axle bore 132, a first pinion shaft bore 134 and a second pinion shaft bore 136. The first axle bore 132 can be disposed about the rotational axis 48a of the differential unit 42 and can intersect the internal cavity 130 on an end of the body 126 opposite the flange 128. The first pinion shaft bore 134 can extend through the body 126 along a first pinion axis 144 that is generally perpendicular to the rotational axis 48a of the differential unit 42. The second pinion shaft bore 136 can extend through the body 126 along a second pinion axis 146 that is generally perpendicular to both the rotational axis 48a of the differential unit 42 and the first pinion axis 144. The differential cover 122 can be coupled to the differential case 120 to substantially close an end of the differential case 120 opposite the first axle bore 132. The differential cover 122 can define a second axle bore 152 that can be arranged about the rotational axis 48*a* of the differential unit 42. The first and second axle bores 132 and 152 can be sized and shaped to engage an end of an associated one of the first and second axle half-shafts 64 and 68 (FIG. 2) in a conventional manner that permits drive torque to be transmitted between the differential housing 100 and the first and second axle half shafts 64 and 68 (FIG. 2).

The first and second bevel side gears 102 and 104 can be conventional in their construction and as such, need not be discussed in significant detail herein. Briefly, the first and second bevel side gears 102 and 104 can include a plurality of gear teeth 160 and a central splined aperture 162 that is configured to non-rotatably but axially slidably engage a corresponding one of the first and second axle half shafts 64 and 68 (FIG. 2) to permit drive torque to be transmitted between the first and second bevel side gears 102 and 104 and the first and second axle half shafts 64 and 68 (FIG. 2). The first and second bevel side gears 102 and 104 can be received in the internal cavity 130 on opposite sides of the differential case 120 such that they are aligned about the rotational axis 48*a* of the differential unit 42 and abutted against the differential case 120 and the differential cover 122, respectively.

The first and second sets of bevel pinions 106 and 108 can be can be conventional in their construction and as such, need not be discussed in significant detail herein. Briefly, the first and second sets of bevel pinions 106 and 108 can include gear teeth 170 that can meshingly engage the first and second bevel side gears 102 and 104, a surface 172 opposite the gear teeth 170 that can be configured to engage the differential case 120, and a through bore 174. In the particular example provided, the opposite surface 172 is arcuate in shape and conforms to the arcuate recesses 176 that are formed in the internal cavity 130 of the differential case 120 at the locations where the first and second pinion shaft bores 134 and 136 intersect the interior side of the wall of the differential case 120. The first set of bevel pinions 106 can include a first pinion 106*a* and a second pinion 106*b* that can be received in the arcuate recesses 176 that are associated with the first pinion shaft bore 134. The second set of bevel pinions 108 can include a first pinion 108*a* and a second pinion 108*b* that can be received in the arcuate recesses 176 that are associated with the second pinion shaft bore 136.

The first pinion shaft 110 can be received in the first pinion shaft bore 134 and through the through bores 174 in the first and second pinions 106*a* and 106*b* of the first set of bevel pinions 106.

Figure 5:
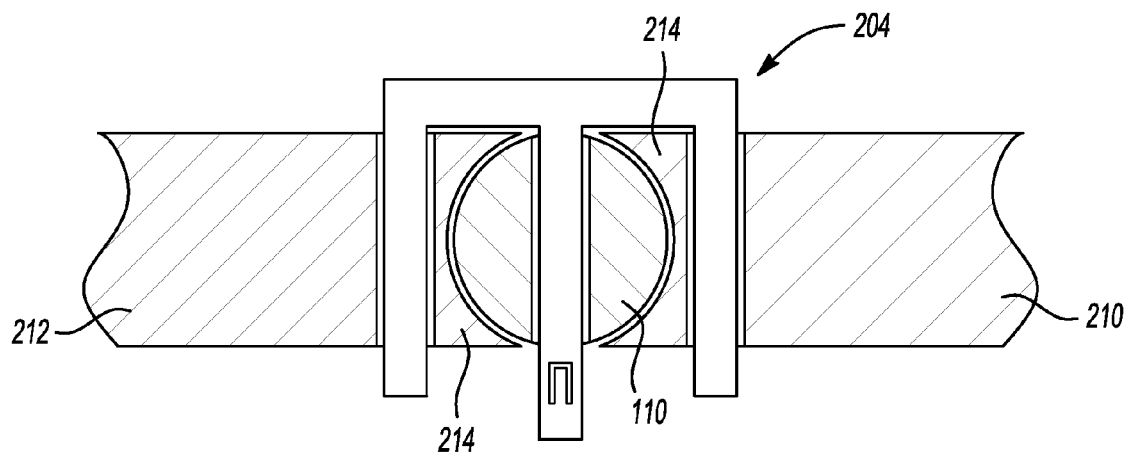
FIG. 5 is a sectional view of a portion of another differential unit constructed in accordance with the teachings of the present disclosure, the figure illustrating the arrangement of the first and second pinion shafts in more detail.

The retainer system 112 can include a second pinion shaft 200, a collar 202 and a retainer 204. The second pinion shaft 200 can support the second set of bevel pinions 108 for rotation in the internal cavity 130 about the second pinion axis 146. The second pinion shaft 200 can include a first pin portion 210 on which the first pinion 108*a* is rotatably disposed, and a second pin portion 212 on which the second pinion 108*b* is rotatably disposed. The first and second pin portions 210 and 212 can be received in the second pinion shaft bore 136 along the second pinion axis 146. In the particular example provided, the first and second pin portions 210 and 212 are discrete cylindrically-shaped members having inner ends 214 that are generally flat and orthorgonal to the second pinion axis 146. It will be appreciated, however, that the first and second pin portions 210 and 212 could have inner ends 214 that conform to a shape of at least a portion of the first pinion shaft 110, an example of which is shown in FIG. 5.

Returning to FIGS. 3 and 4, the collar 202 can be disposed in the internal cavity 130 radially inward of the first and second sets of bevel pinions 106 and 108. The collar 202 can be an annular structure having a first set of apertures 230, which can be sized to receive the first pinion shaft 110 therethrough, and a second set of apertures 232 that are sized to receive the first and second pin portions 210 and 212 therethrough. Accordingly, it will be appreciated that the collar 202 supports the inner ends 214 of the first and second pin portions 210 and 212 on a side opposite the wall of the differential case 120.

Figure 6:
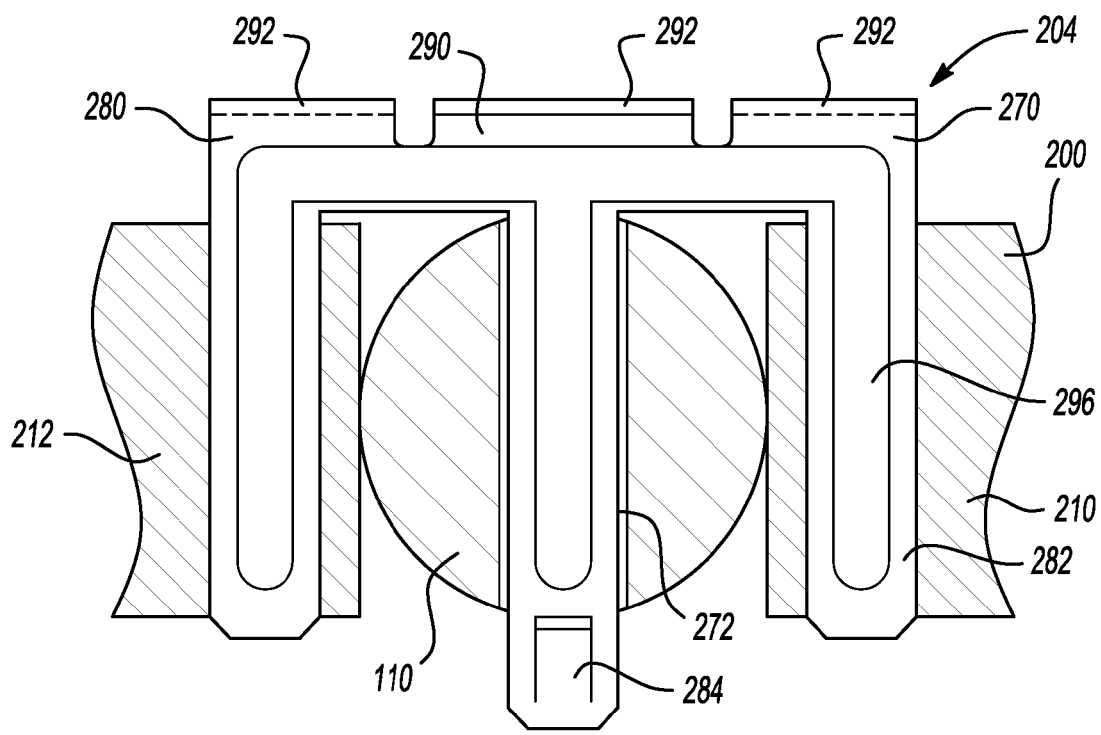
FIG. 6 is a front view of a portion of the vehicle of FIG. 1, illustrating the retainer in more detail.
Figure 7:
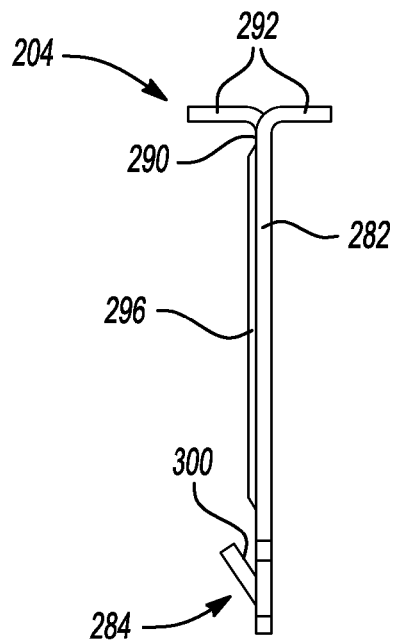
FIG. 7 is a side elevation view of the retainer of FIG. 6.

The retainer 204 can comprise any appropriate means for securing the first and second pinion shafts 110 and 200 relative to the differential case 120. In the example provided, the retainer 204 includes a clip 270 that is received through holes 272 formed in each of the first pinion shaft 110, the first pin portion 210 and the second pin portion 212 at a location that is radially inward of the collar 202. With reference to FIGS. 6 and 7, the clip 270 be a stamping that can be formed of a resilient spring steel material. The clip 270 can include a clip body 280, a plurality of clip legs 282 and one or more engagement members 284. The clip body 280 can have a first portion 290 that can be coupled to each of the clip legs 282 and one or more second portions 292 that can be generally transverse to the first portion 290 to provide lateral stiffness for the clip body 280 and/or the clip legs 282. In the particular example provided, the quantity of second portions 292 corresponds to the quantity of the clip legs 282. The clip legs 282 can extend from the first portion 290 of the clip body 280 on a side opposite the second portion 292 and can be sized to be received in the holes 272. A rib 296 can be embossed into the first portion 290 of the clip body 280 and the clip legs 282 to stiffen these portions of the clip 270.

Each engagement member 284 can be coupled to an end of an associated one of the clip legs 282 on a side opposite the clip body 280. A single engagement member 284 is carried by the center clip leg 282 in the example shown, but it will be appreciated that the engagement member 284 could be carried by two or more of the clip legs 282. The engagement member 284 can be configured to resist the withdrawal of the clip legs 282 from the holes 272. In the particular example provided, the engagement member 284 comprises a resilient barb 300 that deflects inwardly (toward the center clip leg 282) when the center clip leg 282 is inserted into the hole 272 in the first pinion shaft 110 and thereafter deflect outwardly after the engagement member 284 passes wholly through the first pinion shaft 110. When positioned in the outwardly deflected position, the engagement member 284 can contact the first pinion shaft 110 when a withdrawing force is applied to the clip 270 to resist or limit movement of the clip 270 relative to the first and second pinion shafts 110 and 200. It will be appreciated that the engagement member 284 need not employ a resilient engaging member that "locks" upon insertion but could also comprise a tab that is deformed (e.g., bent perpendicular to the clip legs 282) after the engagement member has been wholly inserted through an associated one of the holes 272.

Returning to FIGS. 3 and 4, the clip 270 can be installed to the holes 272 in a direction that can be generally parallel to the rotational axis 48*a* of the differential unit 42. Accordingly, it will be appreciated that the first and second pinion shafts 110 and 200 can be secured to one another in a cost-efficient manner.

Figure 8:
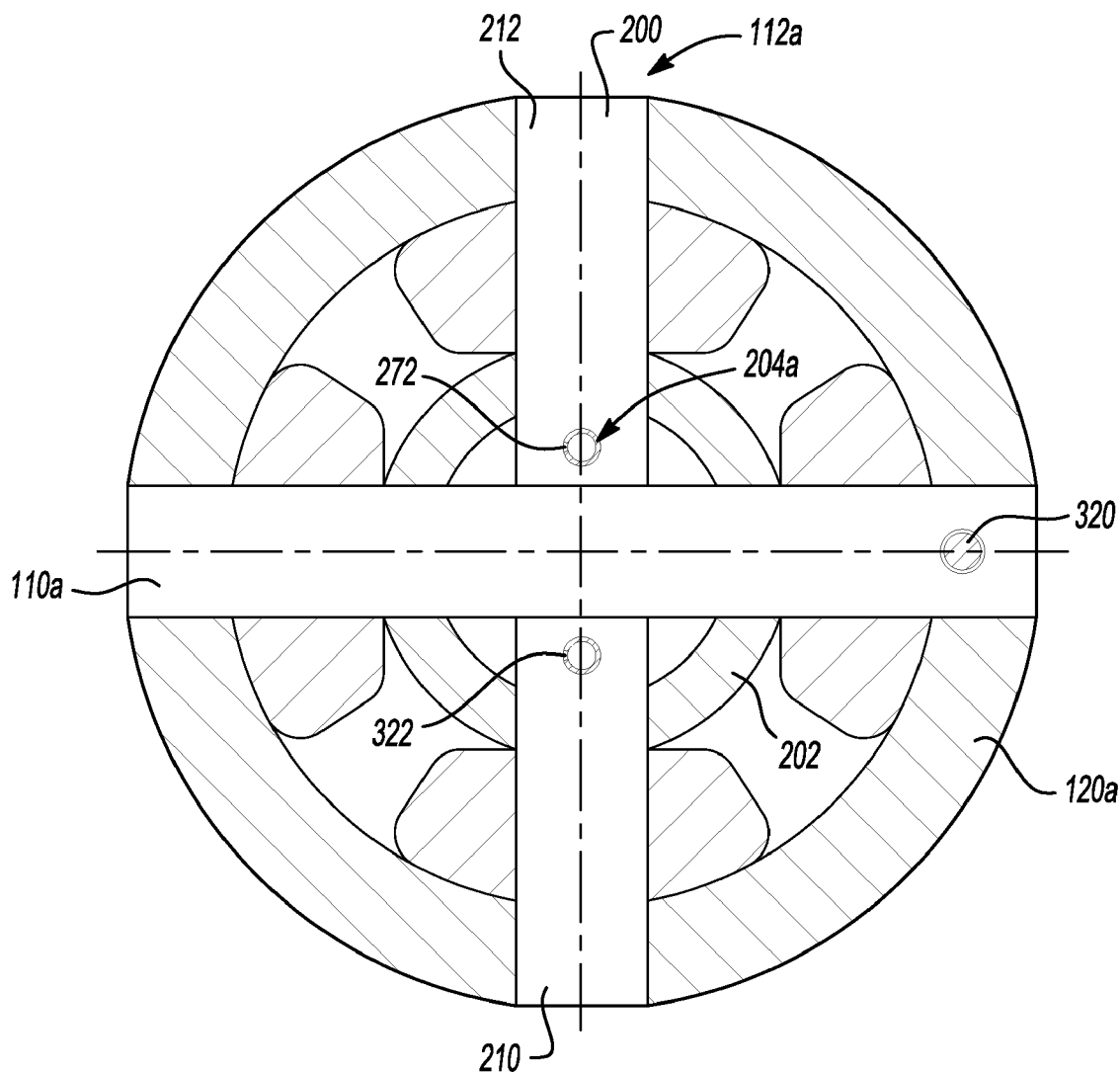
FIG. 8 is a sectional view similar to that of FIG. 4 but illustrating another differential unit constructed in accordance with the teachings of the present disclosure.
Figure 9:
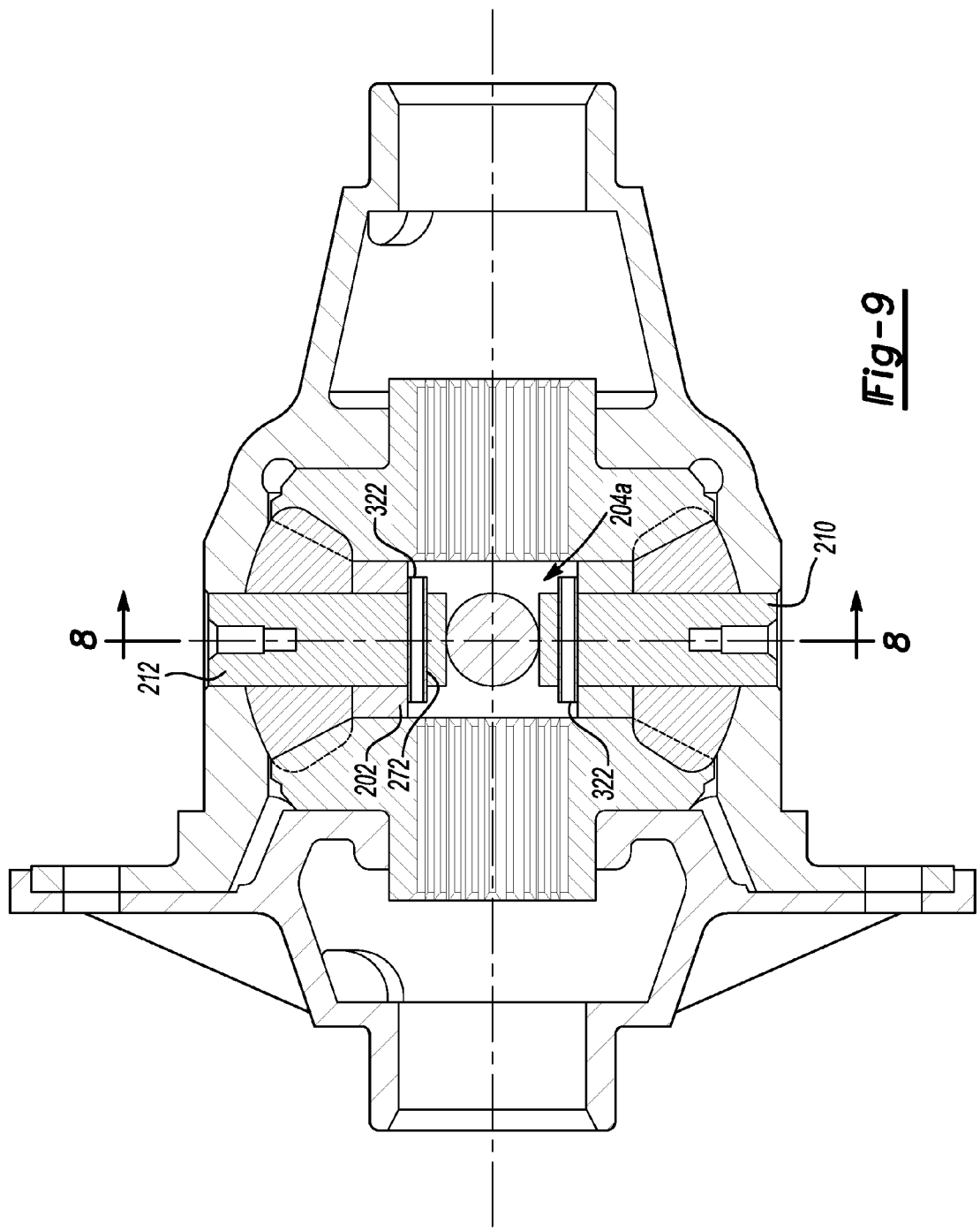
FIG. 9 is a longitudinal section view of the differential unit of FIG. 8.

While the retainer system 112 has been illustrated and described herein as including a clip that secures discrete pin portions to the first pinion shaft 110, it will be appreciated that a differential constructed in accordance with the teachings of the present disclosure could be constructed somewhat differently. For example, the retainer system 112a could include a fastener 320 for securing the first pinion shaft 110a to the differential case 120a and a retainer 204a for securing the first and second pin portions 210 and 212 relative to the differential case 120a as shown in FIGS. 8 and 9. The retainer 204a can include a pair of roll pins 322 that can be received in the holes 272 in the first and second pin portions 210 and 212. The roll pins 322 can frictionally engage the first and second pin portions 210 and 212 and can extend outwardly so as to inhibit withdrawal of the first and second pin portions 210 and 212 from the collar 202.

Figure 8A:
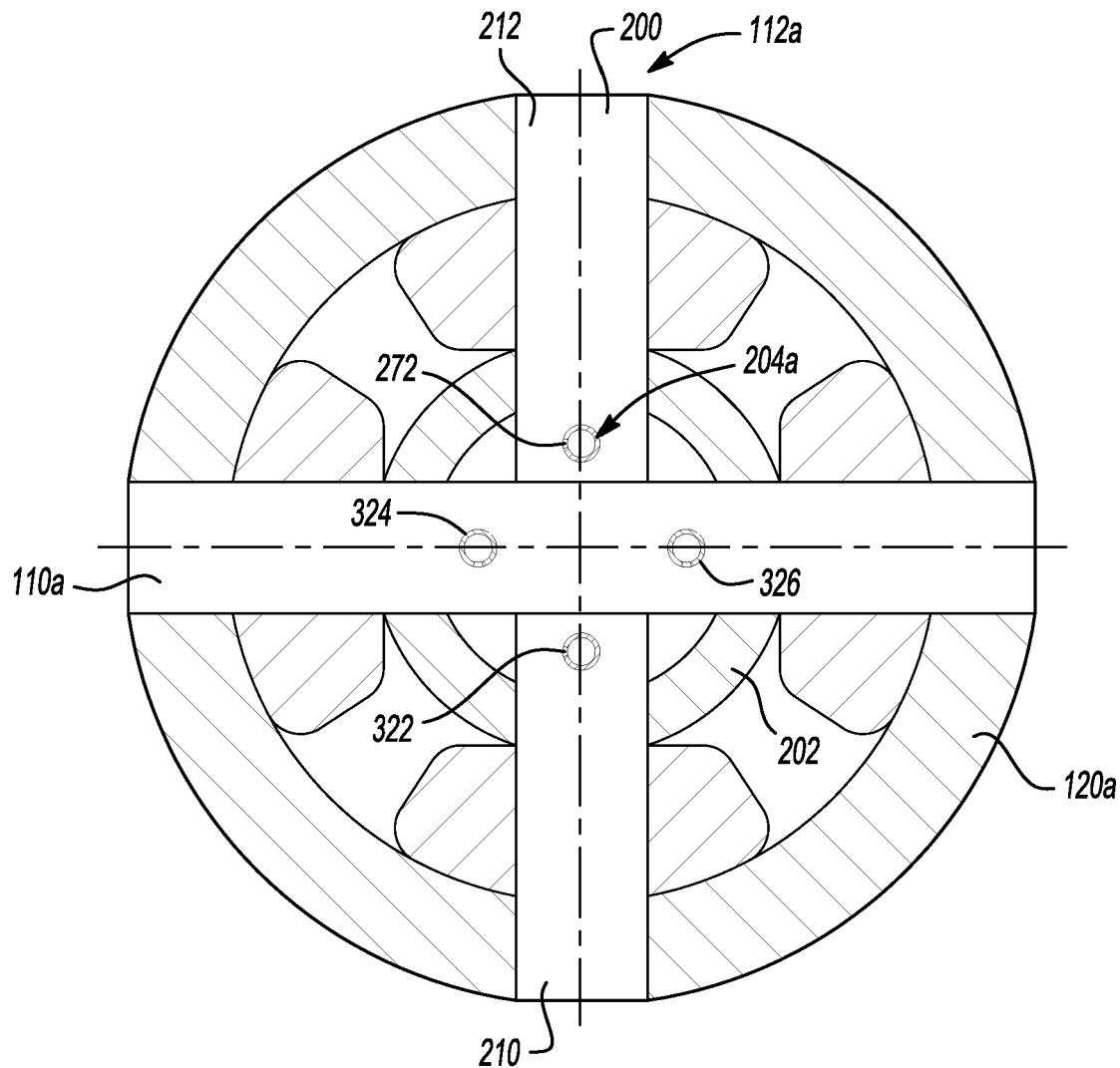
FIG. 8A is a sectional view similar to that of FIG. 8, but illustrating a different means for retaining the first pinion shaft to the differential case.

In one alternative, one or more roll pins 324 can be employed in lieu of the fastener 320 to secure the first pinion shaft 110a relative to the differential case 120a as shown in FIG. 8A. In this example, the roll pins 324 are received in corresponding holes 326 in the first pinion shaft 110a that are located radially inwardly of the collar 202. In another alternative which is illustrated in FIG. 10, a clip 270a having a pair of clip legs 282a can be employed to secure the first and second pin portions 210 and 212 to one another. The clip 270a can be generally similar to the clip 270 of FIG. 6, except that each of the clip legs 282a includes an engagement member 284.

In the example of FIG. 11, the first pinion shaft 110b is relatively larger in diameter than the second pinion shaft 200b. An aperture 400 can be formed through the first pinion shaft 110b through which the second pinion shaft 200b can extend. Configuration in this manner permits the first and second pin portions (not specifically shown) to be a part of a unitary structure. A hole 272b can be formed through the first and second pinion shafts 110b and 200b. The retainer 204b can include a single clip leg 282b that can be received through the hole 272b to thereby couple the first and second pinion shafts 110b and 200b to one another. The clip leg 282b can include an engagement member 284.

The example of FIG. 12 is similar to that of FIG. 11, except that the holes 272c are only formed through the second pinion shaft 200c at locations that are outboard of the first pinion shaft 110c. The retainer 204c can be a clip 270c having two clip legs 282c that are received through the holes 272c. An engagement member 284 can be coupled to each of the clip legs 282c.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A differential unit for an automotive driveline, comprising:
   a differential housing defining an internal cavity;
   a differential gearset disposed within said internal cavity and including first and second side gears, a pair of first pinions meshed with said first and second side gears, and a pair of second pinions meshed with said first and second side gears;
   a first pinion shaft rotatably supporting said first pinions and having its opposite ends disposed in a pair of first bores formed in said differential housing, said second pinion shaft extending through a central aperture formed in said first pinion shaft;
   a second pinion shaft rotatably supporting said second pinions and having its opposite ends disposed in a pair of second bores formed in said differential housing;
   an annular collar disposed radially inwardly of said first and second pinions and having a pair of first apertures through which said first pinion shaft extends and a pair of second apertures through which said second pinion shaft extends; and
   a retainer located radially inward of said collar and engaging at least one of said first and second pinion shafts, said retainer including at least one of a first member disposed in a first hole formed in said first pinion shaft and a second member disposed in a second hole formed in said second pinion shaft.

2. The differential unit of claim 1 wherein said first member of said retainer includes a first pin extending through said first hole and said second member of said retainer includes a second pin extending through said second hole.

3. The differential unit of claim 1 wherein said retainer is a clip having said first member configured as a first leg extending through said first hole and said second member configured as a second leg extending through said second hole.

4. The differential unit of claim 1 wherein said first and second holes are aligned to accept receipt of said retainer therein.

5. The differential unit of claim 1 wherein said second pinion shaft includes a third hole such that said second and third holes are located on opposite sides of said first pinion shaft and radially inward of said collar, and wherein said retainer is a clip having a first leg extending through said first hole, a second leg extending through said second hole, and a third leg extending through said third hole.

6. The differential unit of claim 1 wherein said retainer is disposed within said second hole formed in said second pinion shaft, and wherein said differential unit further includes a second retainer for securing one end of said first pinion shaft to said differential housing.

7. The differential unit of claim 1 wherein said second pinion shaft comprises:
   a first shaft portion having an outer end disposed within one of said second bores in said differential housing, an intermediate section extending through one of said second apertures in said collar, and an inner end disposed adjacent to said first pinion shaft; and
   a second shaft portion having an outer end disposed within the other of said second bores in said differential housing, an intermediate section extending through the other of said second apertures in said collar, and an inner end disposed adjacent to said first pinion shaft.

8. The differential unit of claim 7 wherein said retainer includes a first pin passing through said first hole formed in said first pinion shaft, and a second pin passing through said second hole formed in one of said first and second shaft portions of said second pinion shaft.

9. The differential unit of claim 7 wherein said retainer is a clip having a first leg retained in said first hole formed in said first pinion shaft, a second leg retained in said second hole formed in said inner end of said first shaft portion, and a third leg retained in a third hole formed in said inner end of said second shaft portion.

10. The differential unit of claim 9 wherein at least one of said first, second and third legs of said clip includes a projection adapted to prevent withdrawal of said clip.

11. The differential unit of claim 7 wherein said retainer is a clip having a first leg retained in a hole formed in said inner end of said first shaft portion and a second leg retained in a hole formed in said inner end of said second shaft portion.

12. A differential unit for an automotive driveline, comprising:
   a differential housing having an internal cavity, a pair of aligned first pinion bores and a pair of aligned second pinion bores;
   a differential gearset disposed within said internal cavity and having first and second side gears and paired sets of first and second pinions that are meshed with said first and second side gears;
   an annular collar disposed within an interior space defined between said first and second side gears and said first and second pinions and having a pair of aligned first collar apertures and a pair of aligned second collar apertures;
   a first pinion shaft rotatably supporting said pair of first pinions and having its intermediate section passing through said pair of first collar apertures with its opposite ends disposed within said pair of first pinion bores;
   a second pinion shaft defined by a first shaft portion and a second shaft portion, said first shaft portion rotatably supporting one of said pair of second pinions and having its outer end disposed within one of said pair of second pinion bores and its intermediate section passing through one of said pair of second collar apertures, said second shaft portion rotatably supporting the other of said pair of second pinions and having its outer end disposed with the other of said pair of second pinion bores and its intermediate section passing through the other of said pair of second collar apertures; and
   a retainer engaging at least one of said first and second shaft portions at a location inward of said collar, said retainer passing through holes formed in at least two of said first pinion shaft and said first and second shaft portions of said second pinion shaft.

13. The differential unit of claim 12 wherein said first and second shaft portions are connected and have a central section extending through a central aperture formed through said first pinion shaft.

14. The differential unit of claim 13 wherein a first hole is formed in said first pinion shaft radially inward of said collar, wherein a second hole is formed in said second pinion shaft radially inward of said collar, and wherein said retainer includes a first pin extending through said first hole and a second pin extending through said second hole.

15. The differential unit of claim 13 wherein a first hole is formed in said first pinion shaft radially inward of said collar, wherein a second hole is formed in said second pinion shaft radially inward of said collar, and wherein said retainer is a clip having a first leg extending through said first hole and a second leg extending through said second hole.

16. The differential unit of claim 13 wherein a first hole extends through said first pinion shaft radially inward of said collar and a second hole extends through said central section of second pinion shaft radially inward of said collar, and wherein said first and second holes are aligned to accept receipt of said retainer therein.

17. The differential unit of claim 13 wherein said second pinion shaft includes first and second holes located on opposite sides of said first pinion shaft and located radially inward of said collar, and wherein said retainer is a clip having a first leg extending through said first hole and a second leg extending through said second hole.

18. The differential unit of claim 13 wherein said retainer is disposed within a hole formed in said second pinion shaft, and wherein said differential unit further includes a second retainer for securing one end of said first pinion shaft to said differential housing.

19. The differential unit of claim 12 wherein said first and second shaft portions each have an inner end adjacent to said first pinion shaft, and wherein said retainer includes a first pin passing through a hole formed in said first shaft portion radially inward of said collar and a second pin passing through a hole formed in said second shaft portion radially inward of said collar.

20. The differential unit of claim 19 wherein said retainer further includes a third pin passing through a hole formed in said outer end of said first pinion shaft so as to secure said first pinion shaft directly to said differential housing.

21. The differential unit of claim 19 wherein said retainer further includes a third pin passing through a hole formed in said first pinion shaft radially inward of said collar.

22. The differential unit of claim 12 wherein said retainer is a clip having a first leg retained in a hole formed in an inner end of said first shaft portion, a second leg retained in a hole formed in an inner end of said second shaft portion, and a third leg retained in a hole formed in said first pinion shaft.

23. The differential unit of claim 22 wherein at least one of said first, second and third legs of said clip includes a projection adapted to prevent withdrawal of said clip.

24. The differential unit of claim 12 wherein said retainer is a clip having a first leg retained in a hole formed in an inner end of said first shaft portion and a second leg retained in a hole formed in an inner end of said second shaft portion.

25. A differential unit for an automotive driveline, comprising:
   a differential housing defining an internal cavity;
   a differential gearset disposed within said internal cavity and including first and second side gears, a pair of first pinions meshed with said first and second side gears, and a pair of second pinions meshed with said first and second side gears;
   a first pinion shaft rotatably supporting said first pinions and having its opposite ends disposed in a pair of first bores formed in said differential housing;
   a second pinion shaft rotatably supporting said second pinions and having its opposite ends disposed in a pair of second bores formed in said differential housing;
   an annular collar disposed radially inwardly of said first and second pinions and having a pair of first apertures through which said first pinion shaft extends and a pair of second apertures through which said second pinion shaft extends; and
   a retainer located radially inward of said collar and engaging at least one of said first and second pinion shafts, said retainer is a clip having at least one of a first leg adapted to extend into a first hole formed in said first pinion shaft and a second leg adapted to extend into a second hole formed in said second pinion shaft.

26. The differential unit of claim 25 wherein at least one of said first and second legs of said clip includes a projection adapted to prevent withdrawal of said clip from a corresponding one of said first and second holes.

27. A differential unit for an automotive driveline, comprising:
   a differential housing defining an internal cavity;

a differential gearset disposed within said internal cavity and including first and second side gears, a pair of first pinions meshed with said first and second side gears, and a pair of second pinions meshed with said first and second side gears;

a first pinion shaft rotatably supporting said first pinions and having its opposite ends disposed in a pair of first bores formed in said differential housing;

a second pinion shaft rotatably supporting said second pinions and having its opposite ends disposed in a pair of second bores formed in said differential housing;

an annular collar disposed radially inwardly of said first and second pinions and having a pair of first apertures through which said first pinion shaft extends and a pair of second apertures through which said second pinion shaft extends; and a retainer located radially inward of said collar and engaging said second pinion shaft, said retainer is a clip having a first leg disposed in a first hole formed in said second pinion shaft and a second leg disposed in a second hole formed in said second pinion shaft, wherein said first and second holes are located on opposite sides of said first pinion shaft.

28. The differential unit of claim 27 wherein one of said first and second legs of said clip includes a projection adapted to inhibit withdrawal of said clip.

29. The differential unit of claim 27 wherein said clip further includes a third leg disposed in a third hole formed in said first pinion shaft.

30. A differential unit for an automotive driveline, comprising:

a differential housing defining an internal cavity;

a differential gearset disposed within said internal cavity and including first and second side gears, a pair of first pinions meshed with said first and second side gears, and a pair of second pinions meshed with said first and second side gears;

a first pinion shaft rotatably supporting said first pinions and having its opposite ends disposed in a pair of first bores formed in said differential housing;

a second pinion shaft rotatably supporting said second pinions and having its opposite ends disposed in a pair of second bores formed in said differential housing;

an annular collar disposed radially inwardly of said first and second pinions and having a pair of first apertures through which said first pinion shaft extends and a pair of second apertures through which said second pinion shaft extends;

a first retainer located radially inward of said collar and disposed in a first hole formed in said second pinion shaft; and a second retainer securing one end of said first pinion shaft to said differential housing.

31. The differential unit of claim 30 wherein said first retainer is a clip having a first leg disposed in said first hole formed in said second pinion shaft and a second leg disposed in a second hole formed in said second pinion shaft, and wherein said first and second holes are located on opposite sides of said first pinion shaft.

32. The differential unit of claim 31 wherein one of said first and second legs of said clip includes a projection adapted to inhibit withdrawal of said clip.

* * * * *